(No Model.)  2 Sheets—Sheet 1.

D. E. SHAW & D. BRIGHAM.
Apparatus for Watering Stock.

No. 232,077. Patented Sept. 7, 1880.

Witnesses  Inventors
Nat. E. Oliphant,  David E. Shaw & Dan Brigham,
Geo. R. Porter  per Chas. H. Fowler,
Attorney.

(No Model.)　　　　　　　　　　　　　　2 Sheets—Sheet 2.
D. E. SHAW & D. BRIGHAM.
Apparatus for Watering Stock.

No. 232,077.　　　　　　　　Patented Sept. 7, 1880.

Witnesses
Nat. E. Oliphant,
Geo. R. Porter.

Inventors
David E. Shaw,
Dan Brigham,
per Chas. H. Fowler,
Attorney.

UNITED STATES PATENT OFFICE.

DAVID E. SHAW AND DAN BRIGHAM, OF CHATSWORTH, ILLINOIS.

APPARATUS FOR WATERING STOCK.

SPECIFICATION forming part of Letters Patent No. 232,077, dated September 7, 1880.

Application filed July 3, 1880. (No model.)

*To all whom it may concern:*

Be it known that we, DAVID E. SHAW and DAN BRIGHAM, citizens of the United States, residing at Chatsworth, in the county of Livingston and State of Illinois, have invented certain new and useful Improvements in Apparatus for Watering Stock; and we do hereby declare that the following is a full, clear, and exact description of the same, reference being had to the annexed drawings, making a part of this specification, and to the letters and figures of reference marked thereon.

Figure 1:
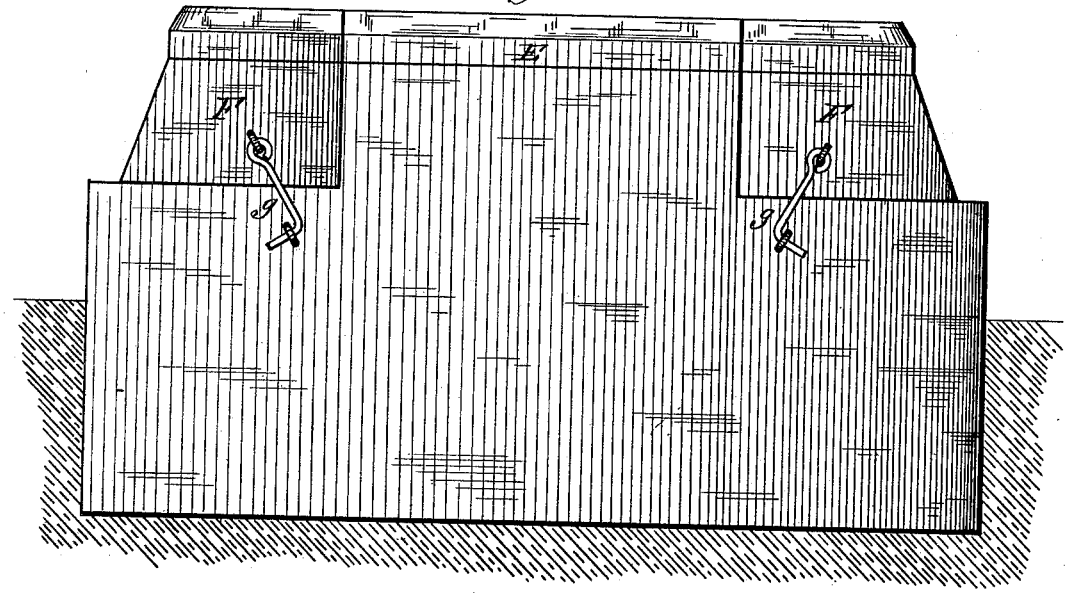
Figure 2:
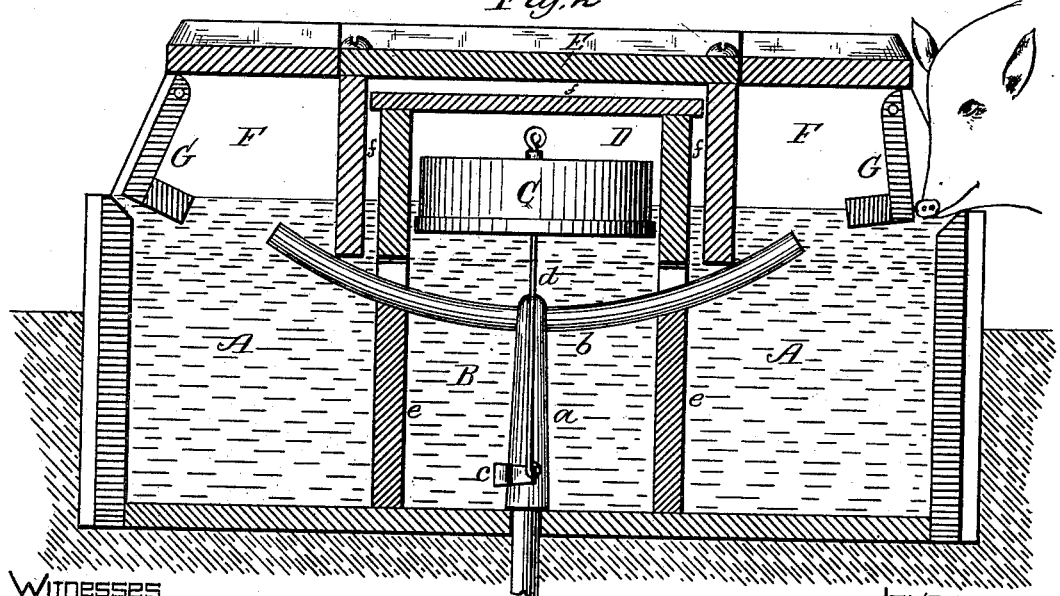
Figure 3:
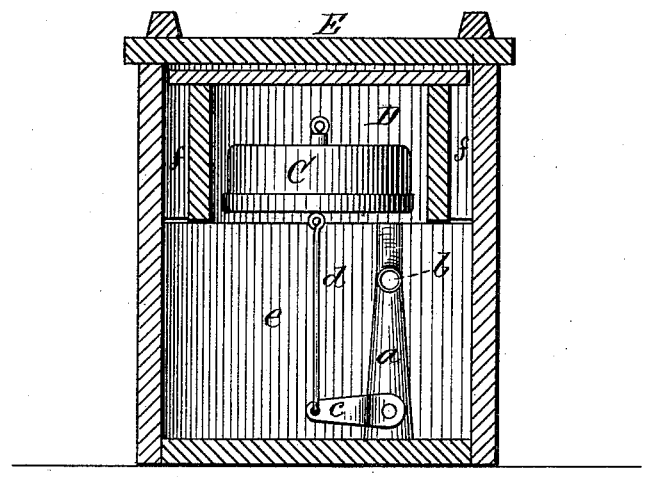
Figure 4:
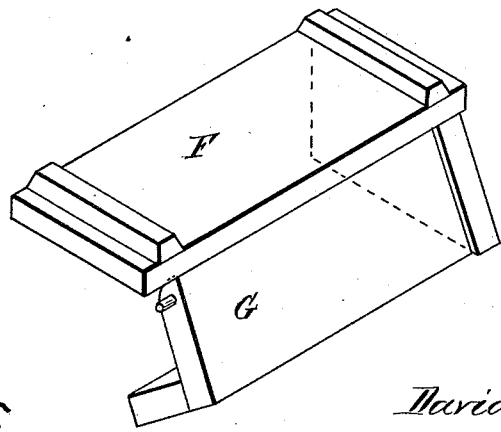

Figure 1 of the drawings is a side elevation of our invention; Fig. 2, a vertical longitudinal section; Fig. 3, a cross-section; and Fig. 4, a detail view, in perspective, of one of the hoods with swinging door, one end of the hood being removed.

This invention has relation to certain new and useful improvements in apparatus for watering stock; and the object thereof is to provide means for keeping the water cool in summer by having the discharge-pipe located at or near the surface of the water, and providing the drinking-apartments with removable hoods having secured thereto swinging weighted doors to protect the water from the rays of the sun, also the cold air from it in winter.

The invention consists in the means shown in the drawings of obtaining these results, and which will be hereinafter described.

In the accompanying drawings, A represents the troughs, having a suitable valve-chamber, B, into which passes a vertical supply-pipe, $a$, said pipe leading from a spring or other means of supply. The pipe $a$ connects at its top with a discharge-pipe, $b$, the ends of the same projecting into the troughs A, near the top thereof.

The pipe $a$ is provided with a suitable valve, $c$, connected by a rod, $d$, to a float, C, for regulating the supply of water in the troughs.

As the cold water remains at the bottom of a vessel, it is desirable in warm weather to furnish the stock with water that will be the same temperature as that at the bottom of the supply-tank. In order to accomplish this, the discharge-pipe $b$ at its ends is located at or near the surface of water, or at that point where the stock will take their drink, the supply-pipe $a$ for this purpose extending some distance up into the valve-chamber B. This valve-chamber B is separated from the troughs A by partitions $e$, a box, D, resting thereon, the lower portion being below the surface of the water, thus sealing the float C within an air-space not accessible by ordinary posts.

An air-space, $f$, is left around the box D and cover E, a small hole being made in the top of the box for the air to pass in or out to insure the successful operation of the float as the water rises or falls, the air-space $f$ also preventing the water around the float from freezing.

Removable hoods F are connected to the upper ends of the troughs A by suitable fastenings $g$, or other desirable means, and to the hoods are connected weighted swinging doors G, adapted to swing inwardly, so that they can be pushed back by the stock when they desire to drink. These doors G keep the sun off the water, and thereby insure its being cool, and also prevent the cold air from coming in contact with it in the winter.

Although the apparatus is designed more particularly for watering hogs, yet by removing the hoods F various kinds of stock can be watered from it, and the removal of the hoods also enables the troughs to be cleaned of the mud and slime which collect at the bottom.

Both the cover E and box D are removable in order to obtain access to the interior of the chamber B when desired to adjust the float C.

The apparatus is set in the ground a sufficient distance to prevent the too rapid formation of ice, as is also the pipe which connects with the supply-pipe $a$.

By removing one of the hoods F two kinds of stock can be watered from the apparatus in two different fields when the apparatus is set in a line of fence.

Having now fully described our invention, what we claim as new, and desire to secure by Letters Patent, is—

1. In an apparatus for watering stock, the combination, with one or more troughs for containing the supply of water, of removable hoods resting upon the top thereof and having weighted doors connected to said hoods so as to swing inwardly, substantially as and for the purpose set forth.

2. In an apparatus for watering stock, the troughs A and chamber B, in combination with the supply-pipe $a$, valve $c$, rod $d$, and float C, said pipe $a$ extending up into the chamber B, and having connected thereto the discharge-pipe $b$, its ends being located at or near the surface of the water, substantially as and for the purpose specified.

3. In an apparatus for watering stock, the troughs A and chamber B, with its float mechanism, in combination with the removable box D and cover E, arranged with relation to each other so as to form air-spaces, substantially as and for the purpose described.

In testimony that we claim the above we have hereunto subscribed our names in the presence of two witnesses.

DAVID E. SHAW.
DAN BRIGHAM.

Witnesses:
LEOPOLD SELMAN,
A. H. MASON.